United States Patent
Sakabe et al.

(10) Patent No.: US 8,837,888 B1
(45) Date of Patent: Sep. 16, 2014

(54) MULTIMODE OPTICAL FIBER INCLUDING A CORE AND A CLADDING

(71) Applicant: Sumitomo Electric Industries, Ltd., Osaka (JP)

(72) Inventors: Itaru Sakabe, Yokohama (JP); Kazuhiro Yonezawa, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/957,902

(22) Filed: Aug. 2, 2013

(51) Int. Cl.
*G02B 6/00* (2006.01)
*G02B 6/36* (2006.01)

(52) U.S. Cl.
USPC .................................. 385/123; 385/132

(58) Field of Classification Search
CPC ........................................................ G02B 6/00
USPC .................................. 385/123–124, 129–132
See application file for complete search history.

(56) References Cited

U.S. PATENT DOCUMENTS

| | | | |
|---|---|---|---|
| 4,391,516 A * | 7/1983 | Boggs et al. | 356/73.1 |
| 5,574,820 A * | 11/1996 | Griscom | 385/142 |
| 6,292,612 B1 | 9/2001 | Golowich et al. | |
| 6,819,849 B1 * | 11/2004 | Tangonan et al. | 385/126 |
| 6,917,740 B2 * | 7/2005 | Boek et al. | 385/123 |
| 7,646,955 B2 | 1/2010 | Donlagic | |
| 7,702,205 B2 * | 4/2010 | Kumano | 385/127 |
| 8,290,323 B2 | 10/2012 | Donlagic | |
| 2004/0202423 A1 * | 10/2004 | White | 385/39 |
| 2006/0193581 A1 * | 8/2006 | Milicevic et al. | 385/123 |
| 2012/0195561 A1 * | 8/2012 | Molin et al. | 385/124 |
| 2013/0322837 A1 * | 12/2013 | Bickham et al. | 385/124 |

OTHER PUBLICATIONS

O.v. mazurin et al., "handbook of glass data Part A, silica glass and binary silicate glasses", Elsevier, 1983, p. 582-583.

* cited by examiner

*Primary Examiner* — Akm Enayet Ullah
(74) *Attorney, Agent, or Firm* — Drinker Biddle & Reath LLP

(57) ABSTRACT

The present invention relates to a multimode optical fiber provided with a region where a refractive index in a peripheral region of a core has deviation from an ideal shape of an α-power refractive-index profile and where an absolute value of an amount of the deviation is not less than 0.005%, so as to generate radiation modes, and a refractive index of a cladding is higher than that of the deviation region.

5 Claims, 7 Drawing Sheets

Fig.7

| | | Samples 1 and 2 | Comparative example |
|---|---|---|---|
| Refractive index n1 | | 1.471 | 1.471 |
| Refractive index n2 | | 1.456 | 1.456 |
| Refractive index n3 | | 1.460 | 1.456 |
| Core radius a ($\mu$m) | | 25 | 25 |
| Maximum deviation(%) from GI type refractive-index profile with $\alpha$ =2.08 | | 0.01 | 0.01 |
| Position ($\mu$m) at maximum deviation (distance $r_{max}$ from core center) | | 20 | 20 |
| Differential group delays (ps/m) (values with respect to fundamental mode LP01,1) | LP0,1 | 0.00 | 0.00 |
| | LP0,2 | 0.10 | 0.10 |
| | LP0,3 | 0.12 | 0.12 |
| | LP0,4 | 0.12 | 0.12 |
| | LP0,5 | 0.16 | 0.16 |
| | LP0,6 | 0.15 | 0.15 |
| | LP0,7 | — | 0.38 |
| | LP0,8 | — | 0.42 |
| | LP0,9 | — | 0.60 |
| | LP0,10 | — | 0.58 |

MULTIMODE OPTICAL FIBER INCLUDING A CORE AND A CLADDING

BACKGROUND OF THE INVENTION

1. Field of the Invention

The present invention relates to a multimode optical fiber.

2. Related Background Art

It is known that the multimode optical fibers have large transmission losses because of their structure, when compared to single-mode optical fibers for long-haul optical transmission. On the other hand, the multimode optical fibers allow easy splicing between fibers and easy connection between devices and therefore are commonly used in application of short-haul information transmission like a LAN (Local Area Network). For the purpose of improvement in short-haul information transmission, studies also have been conducted on technologies to reduce the aforementioned transmission losses of the multimode optical fibers and on expansion of communication band (achievement of a wider bandwidth).

SUMMARY OF THE INVENTION

The Inventors conducted detailed research on the conventional multimode optical fibers and found the problem as described below. It is noted that in the present specification a simple expression of "optical fiber" without any specific note shall mean "multimode optical fiber."

The multimode optical fibers are known as optical transmission media in which a plurality of modes propagate. However, as, particularly, radiation modes (higher-order modes with large differential group delays) out of these modes propagate in the longitudinal direction of the multimode optical fiber, the differential group delays among propagation modes become larger; therefore, there was a limit to achievement of a wider bandwidth of the multimode optical fiber.

Particularly, when the core has an α-power refractive-index profile, a change rate of refractive index along the radial direction becomes larger in a peripheral region of the core and thus the refractive indices of the core of the optical fiber actually manufactured are apt to deviate from designed values. If an actual refractive index profile deviates from its ideal shape, mode dispersion will increase; therefore, a manufacturing error of optical fiber was also a factor that hindered achievement of a wider bandwidth in the multimode optical fiber.

The present invention has been accomplished in order to solve the above problem and it is an object of the present invention to provide a multimode optical fiber having a structure for reducing the differential group delays among propagation modes, thereby enabling achievement of a wider bandwidth.

The present invention relates to a GI (Graded Index) multimode optical fiber with a GI type refractive-index profile including a region in which the refractive index continuously decreases along the radial direction from the central axis (which is a region having an α-power refractive-index profile), and the multimode optical fiber is definitely discriminated in terms of structure from single-mode optical fibers for long-haul transmission. The GI multimode optical fiber also includes a GI multimode optical fiber with a trench part of a low refractive index provided on an outer peripheral surface of a core region (which will also be referred to hereinafter as BI (Bend-Insensitive) multimode optical fiber), as well as the multimode optical fiber with the general structure composed of a high-refractive-index core region and a low-refractive-index cladding region.

A multimode optical fiber according to an embodiment of the present invention comprises at least: a core extending along a central axis of the multimode optical fiber and having an α-power refractive-index profile; and a cladding provided outside the core. The multimode optical fiber may be configured by adopting a contact structure in which an outer peripheral surface of the core is in direct contact with the cladding. The multimode optical fiber may also be configured by adopting a multilayer structure having an intermediate layer provided between the core and the cladding, in addition to the core and the cladding.

The multimode optical fiber according to the present embodiment achieves a wider bandwidth by positively coupling higher-order modes with large differential group delays with respect to the fundamental mode to cladding modes (or by positively leaking the higher-order modes to the cladding side). Specifically, a first aspect of the present embodiment comprises a structure for leaky modes (higher-order modes) with large differential group delays generated in a peripheral region away from a central region of the core, into the cladding located outside the core. This keeps the differential group delays small among propagation modes in the core, so as to achieve a wider bandwidth in the multimode optical fiber. In the present specification, the central region of the core is defined as a region in which a light density is substantially low enough not to significantly affect the differential group delays among propagation modes, and region where the distance in the radial direction from the central axis is not more than 20% of the radius of the core. The peripheral region of the core is defined as a region surrounding the central region, and region where a change rate of refractive index along the radial direction is large, where the actual refractive-index profile is apt to deviate from designed values during manufacture of the fiber, and where if it deviates actually, the radiation modes will be easily generated because of the deviation of refractive index.

In the first aspect of the present embodiment, the core comprises: a region whose refractive-index profile follows an α-power refractive-index profile; and a region where the refractive index has deviation from an ideal shape of the α-power refractive-index profile and where an absolute value of an amount of the deviation is not less than 0.005% in terms of relative refractive-index difference (which will be referred to as profile deviation portion); a point where the absolute value of the amount of the deviation is maximum is in the peripheral region of the core (the part which is located inside the core and in which the distance from the center is over 20% of the radius of the core) and in a low-refractive-index region having refractive indices lower than the refractive index of the cladding. This low-refractive-index region may be a region wider than the peripheral region of the core.

As a second aspect applicable to the first aspect, the refractive index in the central region of the core may be higher than the refractive index of the cladding. When a comparison is made between a case where the refractive index of the central region of the core is higher than that of the cladding and a case where the refractive index of the central region of the core is lower than that of the cladding, the transmission losses in bending of the optical fiber can be kept lower in the case where the refractive index of the central region of the core is higher than that of the cladding than in the lower case.

As a third aspect applicable to at least either one of the first and second aspects, the cladding is preferably one doped with chlorine. As a fourth aspect applicable to at least any one of the first to third aspects, the multimode optical fiber may be configured by adopting a structure in which an outer peripheral surface of the core is in contact with the cladding. On the other hand, as a fifth aspect applicable to at least any one of the first to third aspects, the multimode optical fiber may be configured by adopting a structure further comprising an intermediate layer which is provided between the core and the cladding and which has a lower refractive index than the cladding, as described above. By either one of the fourth and fifth aspects, the differential group delays among propagation modes in the core are also kept small, so as to enable achievement of a wider bandwidth.

Each of embodiments according to the present invention can become more fully understood from the detailed description given hereinbelow and the accompanying drawings. These embodiments are presented by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, and it is apparent that various modifications and improvements within the scope of the invention would be obvious to those skilled in the art from this detailed description.

BRIEF DESCRIPTION OF THE DRAWINGS

FIG. 7 is a table for comparison among occurrences of differential group delays, in each of samples of the multimode optical fibers according to the first and second embodiments and the multimode optical fiber according to the comparative example.

DETAILED DESCRIPTION OF THE PREFERRED EMBODIMENTS

Each of embodiments of the multimode optical fiber according to the present invention will be described below in detail with reference to the accompanying drawings. The same elements will be denoted by the same reference signs in the description of the drawings, without redundant description.

First Embodiment

Figure 1A:
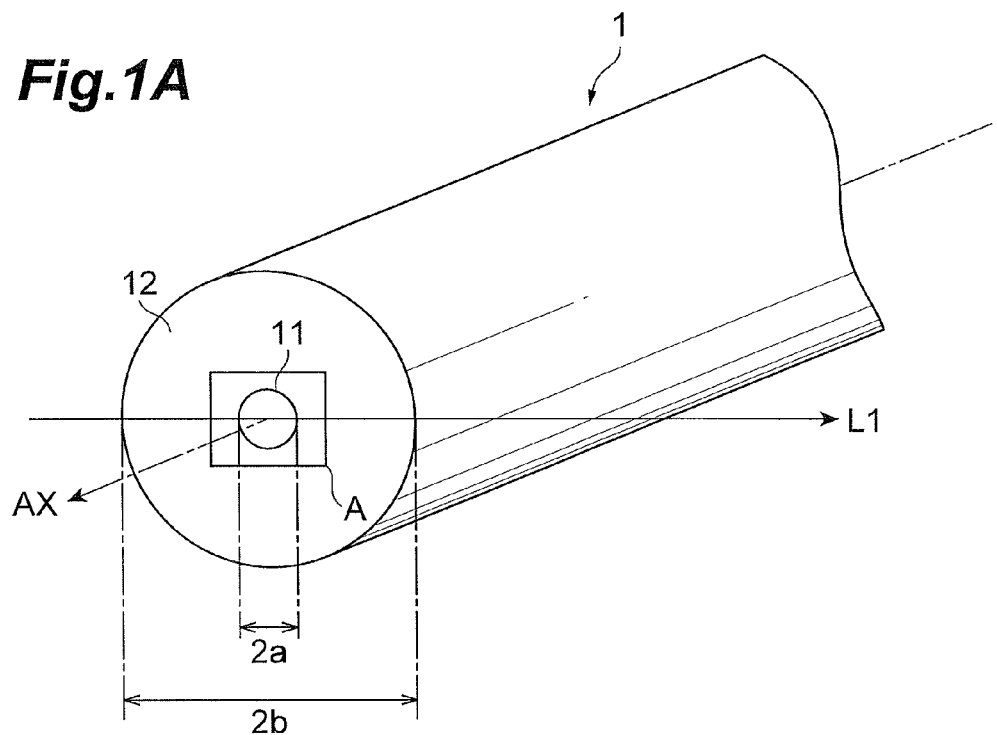
FIG. 1A is a drawing showing a cross-sectional structure of a multimode optical fiber according to the first embodiment, and FIG. 1B a refractive-index profile thereof.
Figure 1B:
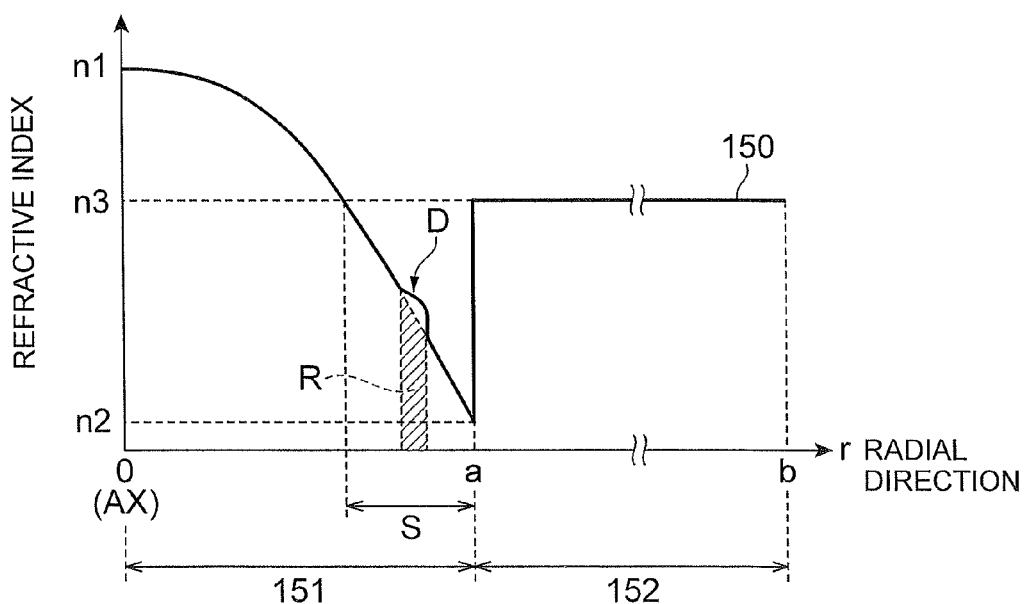

FIG. 1A is a drawing showing a cross-sectional structure of a multimode optical fiber according to the first embodiment, and FIG. 1B a refractive-index profile thereof.

The multimode optical fiber 1 of the first embodiment shown in FIG. 1A has a core 11 extending along a central axis AX (coincident with the optical axis), and a cladding 12 provided on an outer peripheral surface of the core 11. The core 11 has an outer diameter $2a$, contains $GeO_2$ (germanium dioxide), and has an α-power refractive-index profile in which the refractive index continuously decreases along the radial direction from a center thereof coincident with the central axis AX. The core 11 has a maximum refractive index n1 at the center thereof and a minimum refractive index n2 at an interface between the core 11 and the cladding 12. The cladding 12 contains chlorine, has an outer diameter $2b$, and has a refractive index n3 not less than the minimum refractive index n2. The refractive index n3 of the cladding 12 may be higher than the maximum refractive index n1 of the core 11.

The multimode optical fiber 1 has a refractive-index profile 150 shown in FIG. 1B. The refractive-index profile 150 shown in FIG. 1B shows refractive indices of respective parts on a line L1 perpendicular to the central axis AX (optical axis) in FIG. 1A and corresponds to a refractive-index profile along the radial direction of the multimode optical fiber 1. More specifically, a region 151 from the core center (a site at the radius r=0 coincident with the central axis AX) to the radius r=a is a region corresponding to the core 11, and a region 152 in the range of the radius r larger than a and not more than b is a region corresponding to the cladding 12.

The multimode optical fiber 1 having the refractive-index profile 150 as shown in FIG. 1B is obtained by drawing an optical fiber preform having a refractive-index profile of a shape similar to the refractive-index profile 150. As an example, the optical fiber preform is obtained by preparing a core preform corresponding to the core 11 doped with $GeO_2$ for adjustment of refractive index by the OVD (Outside Vapor phase Deposition) method, subjecting the core preform to steps of dehydration, sintering, extension, and so forth, and thereafter further producing a peripheral part corresponding to the cladding 12 containing chlorine for adjustment of refractive index and others, on the outer periphery of the resulting core preform by the VAD (Vapor phase Axial Deposition) method. The shape of the refractive-index profile of the optical fiber preform can be controlled by changing a doping amount of $GeO_2$, chlorine, or the like in the radial direction. For example, o.v. mazurin, et al., "handbook of glass data Part A, silica glass and binary silicate glasses," ELSEVIER, pp. 582-583, 1983 (Literature 1) shows the relationship between doping amounts of $GeO_2$ added in glass materials as major materials of optical fiber and refractive indices of the glass materials.

As shown in FIG. 1B, the core 11 has the α-power refractive-index profile and is composed of a central region whose radius is not more than 20% of the core radius a, and a peripheral region surrounding the central region. In the peripheral region of the core 11, there is a low-refractive-index region S having lower refractive indices than the cladding 12. Since a profile deviation portion D including a portion where the refractive-index profile of the core has deviation from an ideal shape of the α-power refractive-index profile and where a maximum value of the deviation is not less than 0.005% in terms of relative refractive-index difference is apt to be formed in the peripheral region of the core 11 where a change rate of refractive index is large (which is a region where it is difficult to control the refractive-index profile during manufacture of fiber), the low-refractive-index region S is set so as to be included in this peripheral region. The low-refractive-index region S is set to include a point where the profile deviation in a region R defining the profile deviation portion D along the radial direction of the multimode optical fiber 1 is maximum. Since the relationship between the peripheral region and the low-refractive-index region S of the core 11 is defined by the relationship between the refractive indices of the respective parts in the core 11 and the refractive index of the cladding 12, it is natural that the low-refractive-index region S can be larger than the peripheral region of the core 11 (region which is located inside the core and over 20% of the core radius away from the core center). When the refractive index n3 of the cladding 12 is higher than the lowest refractive index (the refractive index at a point 20% of the core radius away from the core center) in the central portion of the core 11 (portion not more than 20% of the radius in the radial direction from the central axis of the core), the low-refractive-index region S becomes larger than the peripheral region of the core. On the contrary, if the refractive index n3 of the cladding 12 is lower than the lowest refractive index (the refractive index at the point 20% of the core radius away from the core center) in the central portion of the core 11 (portion not more than 20% of the radius in the radial direction from the central axis of the core), the low-refractive-index region S becomes smaller than the peripheral region of the core. If the refractive index n3 of the cladding 12 is larger than the maximum refractive index n1 of the core, the whole core becomes the low-refractive-index region S.

Figure 2:
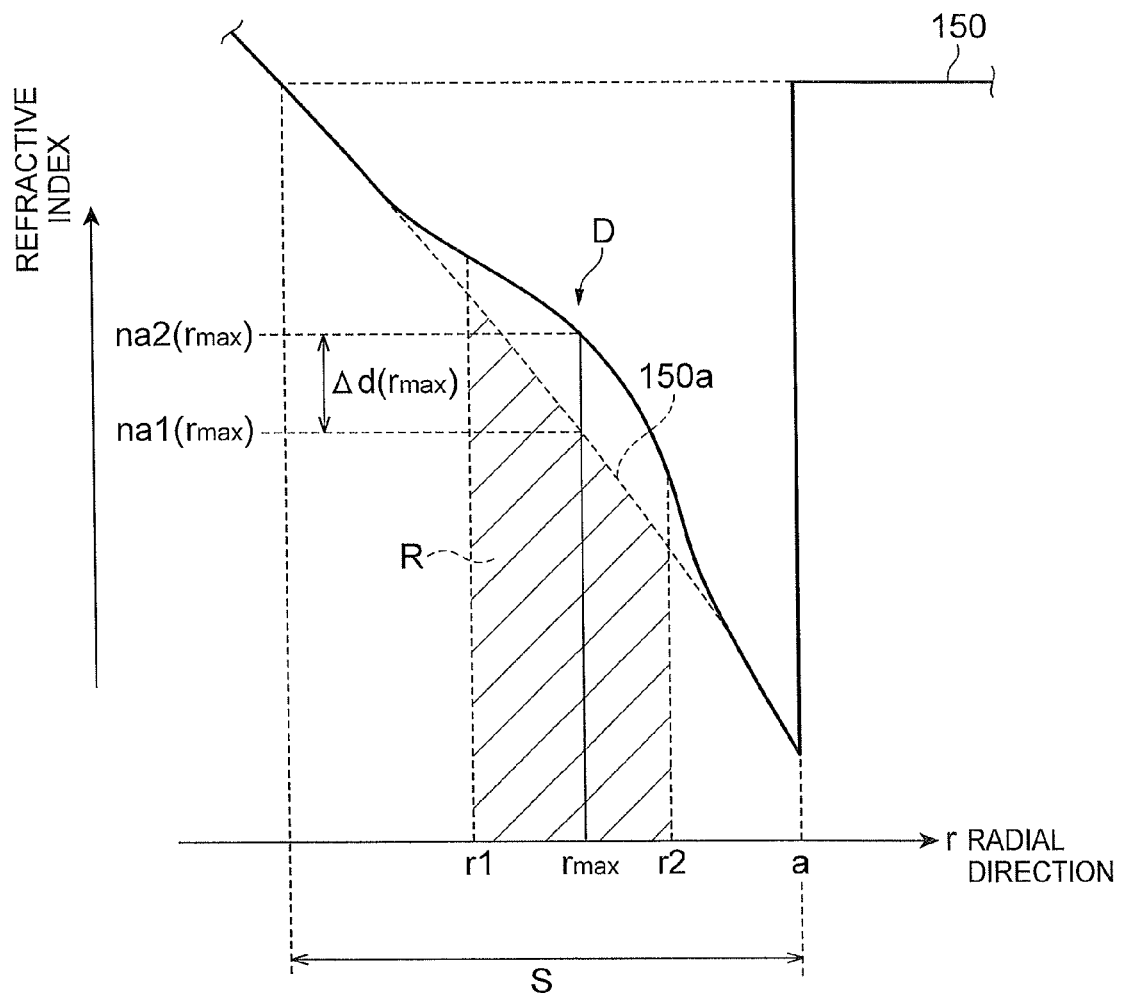
FIG. 2 is a drawing for explaining an example of a profile deviation portion.

FIG. 2 is a drawing for detailing the profile deviation portion D formed in the low-refractive-index region S. In FIG. 2, a dashed line 150a indicates the ideal shape of the α-power refractive-index profile of the core (which will be referred to as ideal profile).

Namely, the shape of the refractive-index profile in the core 11 is defined by the exponent α and, normally, this exponent α is selected as a numerical value in the range of 1.9 to 2.3. Specifically, a maximum relative refractive-index difference Δ of the maximum refractive index n1 with respect to the minimum refractive index n2 of the core 11 is given by Expression (1) below. The ideal profile 150a of refractive index n(r) at the distance r from the center of the core having the radius a is given by Expression (2) below.

$$\Delta = \frac{(n1^2 - n2^2)}{2n1^2} \quad (1)$$

$$n(r) = n1\left(1 - 2\Delta\left(\frac{r}{a}\right)^\alpha\right)^{\frac{1}{2}} \quad (2)$$

In these expressions, a represents the core radius, n1 the refractive index at the core center (maximum refractive index), and Δ the maximum relative refractive-index difference of the core 11 with respect to the refractive index at the radius r=a as described above.

The present first embodiment is configured as follows: in the low-refractive-index region S with the lower refractive indices than the cladding 12 in the peripheral region of the core 11, the profile deviation portion D having the deviation of not less than 0.005% from the ideal profile 150a is defined by the region R not less than a radius r1 and not more than a radius r2 and the point assuming the maximum of the deviation (radius $r_{max}$) also exists in the region R.

Figure 3:
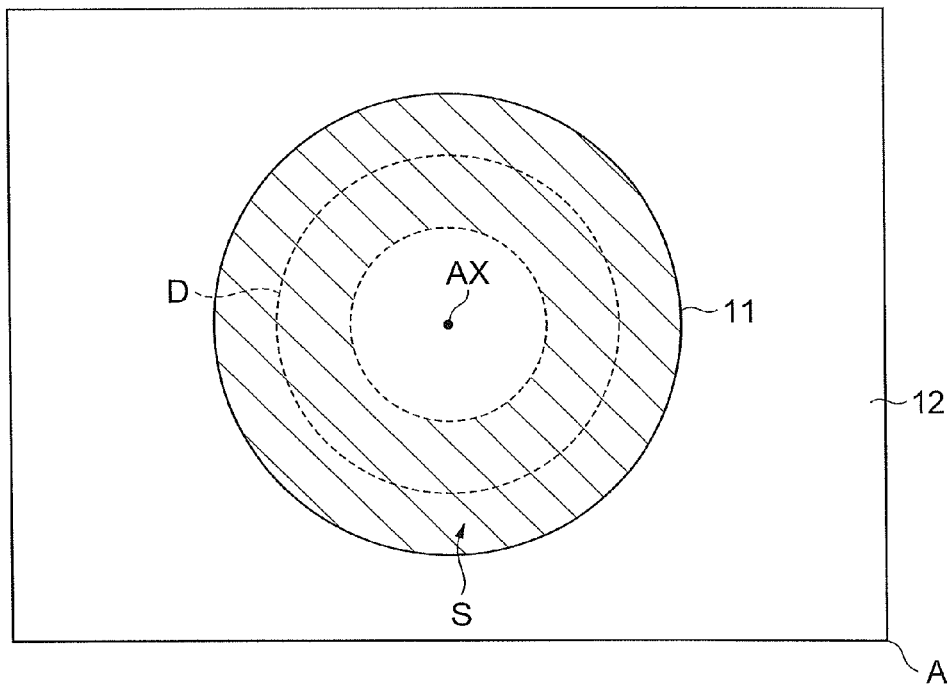
FIG. 3 is a drawing showing a part of the cross section in the multimode optical fiber shown in FIG. 1A, as an enlarged view of a region indicated by A in FIG. 1A.

FIG. 3 is a drawing showing a part of the cross section in the multimode optical fiber shown in FIG. 1A, as an enlarged view of the region indicated by A in FIG. 1A.

As shown in FIG. 3, the core 11 surrounded by the cladding 12 is composed of the central region including the central axis AX (coincident with the core center), and the peripheral region surrounding the central region. Particularly, the central region is defined as a region where a light density is substantially low enough not to significantly affect the differential group delays among propagation modes, and region where the distance in the radial direction from the central axis AX is not more than 20% of the core radius a. On the other hand, the region indicated by hatching in FIG. 3 represents the low-refractive-index region S having the lower refractive indices than the cladding 12. Since the relationship between the peripheral region and the low-refractive-index region S of the core 11 is defined by the relationship between the refractive indices of the respective parts in the core 11 and the refractive index of the cladding 12, they do not always coincide, but the profile deviation portion D indicated by dashed lines in FIG. 3 is formed in an overlapping region between the peripheral region and the low-refractive-index region S of the core 11 and is formed so as to surround the central axis AX of the multimode optical fiber 1. The whole core 11 may be set to be the low-refractive-index region S.

The multimode optical fiber 1 of the first embodiment having the structure as described above is configured so that the profile deviation portion D (region to generate radiation modes with large differential group delays) in the low-refractive-index region S having the lower refractive indices than the cladding 12, in the peripheral region of the core 11 has the structure (structure in which the maximum deviation of refractive index of the core is not less than 0.005% from the refractive index following the ideal profile and the point at the maximum deviation is in the low-refractive-index region) for coupling the radiation modes generated in the profile deviation portion D, to the cladding modes (or leaking them into the cladding 12 located outside the core 11). This configuration keeps the differential group delays small among propagation modes in the core 11, so as to achieve a wider bandwidth of the multimode optical fiber 1.

Figure 4:
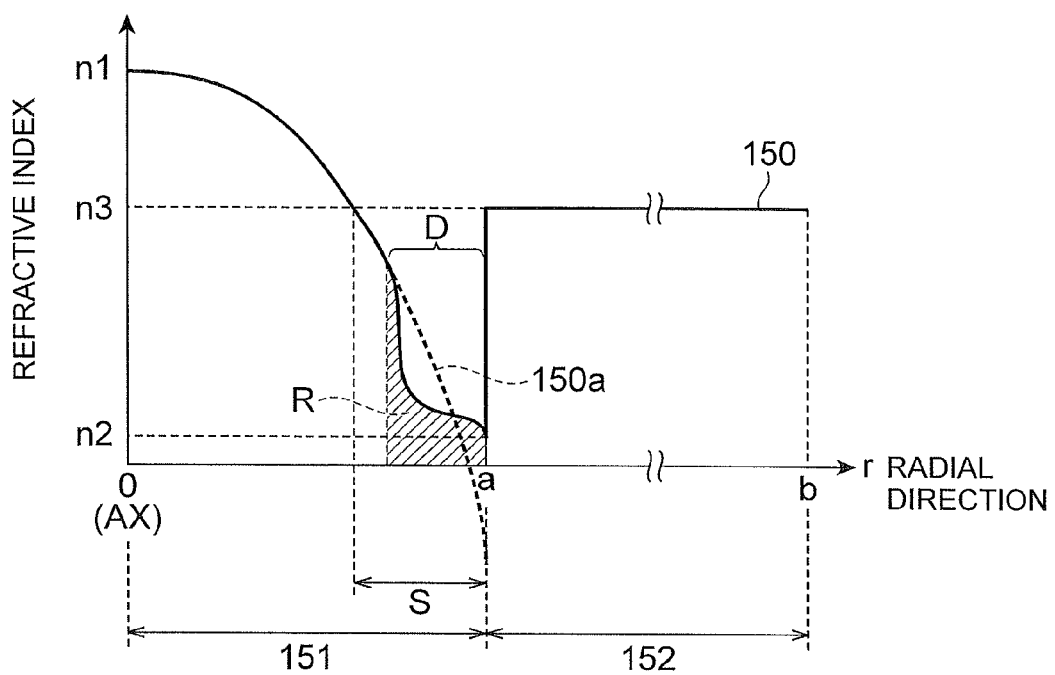
FIG. 4 is a drawing for explaining another example of the profile deviation portion.

For the profile deviation portion D there can be either a case where it has the refractive indices higher than the ideal profile or a case where it has the refractive indices lower than the ideal profile. In the lower case, the maximum deviation of refractive index is not less than 0.005% below the ideal profile. For example, as shown in FIG. 4, a portion with higher refractive indices and a portion with lower refractive indices may exist continuously with respect to the ideal profile 150a. The profile deviation portion D may be in the outermost layer portion of the core 11 and the cladding 12 may be located immediately outside the profile deviation portion D.

Second Embodiment

Figure 5A:
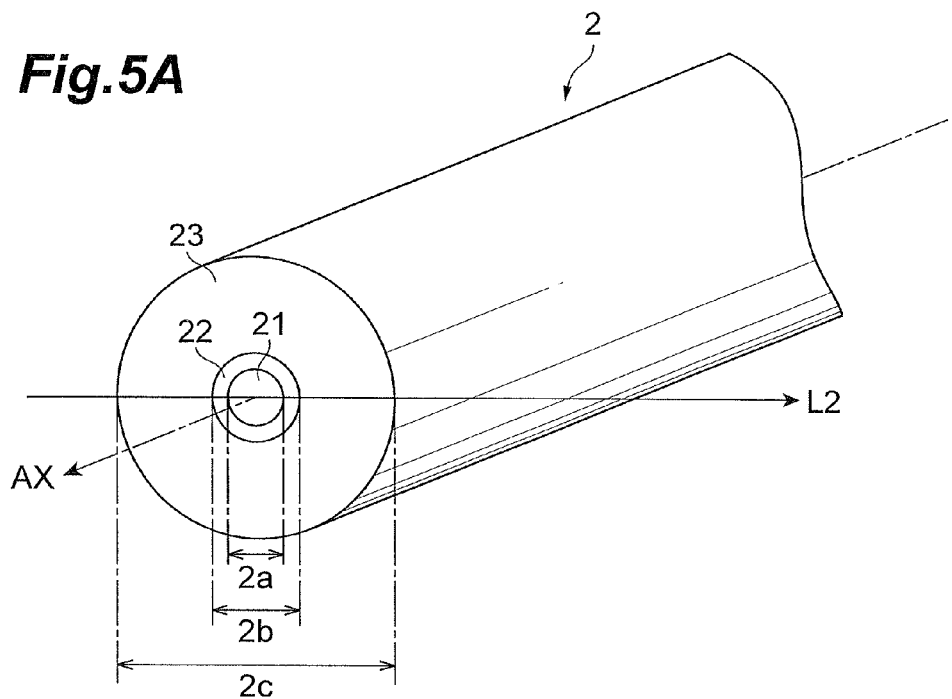
FIG. 5A is a drawing showing a cross-sectional structure of a multimode optical fiber according to the second embodiment and FIG. 5B a refractive-index profile thereof.
Figure 5B:
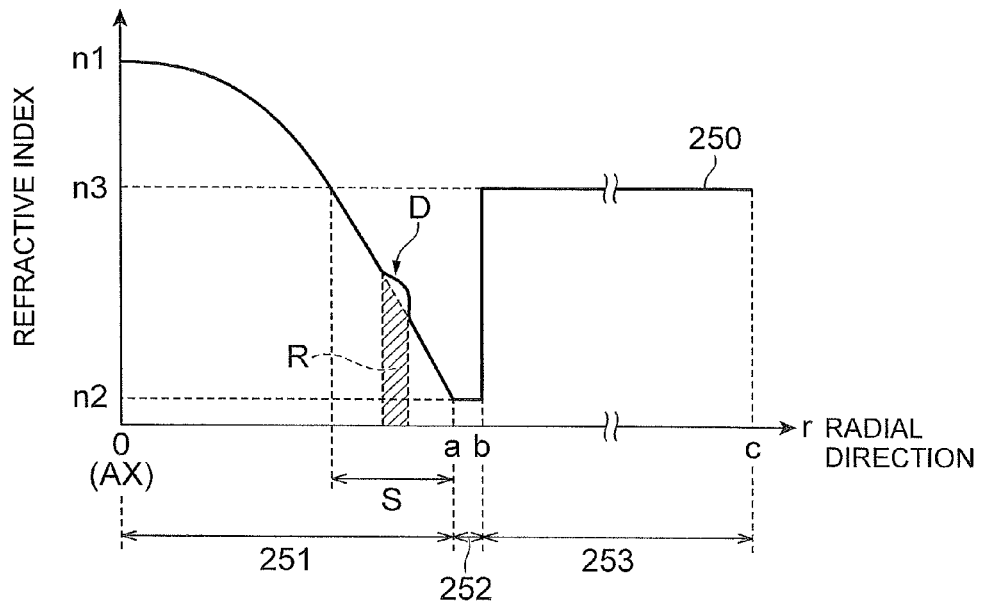

FIG. 5A is a drawing showing a cross-sectional structure of a multimode optical fiber 2 according to the second embodiment and FIG. 5B a refractive-index profile thereof.

The multimode optical fiber 2 of the second embodiment shown in FIG. 5A has a core 21 extending along a central axis AX (coincident with the optical axis), an intermediate layer 22 provided on an outer peripheral surface of the core 21, and a cladding 23 provided on an outer peripheral surface of the intermediate layer 22. The core 21 has an outer diameter 2a, contains $GeO_2$, and has an α-power refractive-index profile in which the refractive index continuously decreases along the radial direction from a core center coincident with the central axis AX. The core 21 has a maximum refractive index n1 at the center thereof (the core center coincident with the central axis AX) and a minimum refractive index n2 at an interface between the core 21 and the intermediate layer 22. The intermediate layer 22 has an outer diameter 2b and the refractive index n2. The cladding 23 contains chlorine, and has an outer diameter 2c and a refractive index n3 not less than the minimum refractive index n2. The refractive index n3 of the cladding 23 may be not more than the maximum refractive index n2 of the core 21 and may be higher than the maximum refractive index n1 of the core 21, as in the first embodiment.

The multimode optical fiber 2 has a refractive-index profile 250 shown in FIG. 5B. The refractive-index profile 250 shown in FIG. 5B shows the refractive indices of the respective parts on a line L2 perpendicular to the central axis AX (optical axis) and corresponds to a refractive-index profile along the radial direction of the multimode optical fiber 2. More specifically, a region 251 from the core center (site at the radius r=0) to the radius r=a is a region corresponding to the core 21, a region 252 in the range of radius r larger than a and not more than b is a region corresponding to the intermediate layer 22, and a region 253 in the range of radius r larger than b and not more than c is a region corresponding to the cladding 23.

The multimode optical fiber 2 having the refractive-index profile 250 as shown in FIG. 5B is also obtained by drawing an optical fiber preform having a refractive-index profile of a shape similar to the refractive-index profile 250 and the shape of the refractive-index profile of the optical fiber preform is controlled by changing a doping amount of $GeO_2$, chlorine, or the like in the radial direction, as in the first embodiment. The relationship between doping amounts of $GeO_2$ added in glass materials as major materials of optical fiber and refractive indices of the glass materials is shown in the aforementioned Literature 1.

In the multimode optical fiber 2 of the present second embodiment, the relation between the central region and the peripheral region in the core 21, the relation between the peripheral region and the low-refractive-index region S in the core 21, the region where the profile deviation portion D is formed, and the definition of the deviation between the ideal profile and the actual α-power refractive-index profile are the same as those in the aforementioned first embodiment (cf. FIGS. 2 and 3). However, the refractive index as a basis for relative refractive-index differences of the respective parts in the core 21 is defined as the refractive index at the boundary between the intermediate layer 22 and the cladding 23 (the position at the radius b in FIG. 5B), i.e., the minimum refractive index n2 of the core 21. The core 21 having the α-power refractive-index profile is composed of the central region whose radius is not more than 20% of the core radius a, and the peripheral region surrounding the central region, as in the first embodiment. Similar to an example shown in FIG. 3, the low-refractive-index region S having the lower refractive indices than the cladding 23 exists so as to surround the central axis AX, at least in the peripheral region of the core 21. The profile deviation portion D where the α-power refractive-index profile has the deviation of not less than 0.005% from the ideal shape is formed in the low-refractive-index region S (cf. FIG. 3). A point where the profile deviation is maximum (point at the radius $r_{max}$) exists in the region R not less than the radius r1 and not more than the radius r2 defining the profile deviation portion D along the radial direction of the multimode optical fiber 2. This point at the radius $r_{max}$ is present in the low-refractive-index region S. The relation between the peripheral region and the low-refractive-index region S of the core 21 is defined by the relation between the refractive indices of the respective parts in the core 21 and the refractive index of the cladding 23 and the low-refractive-index region S can be larger than the peripheral region of the core 21. This is the same as described in the first embodiment.

The multimode optical fiber 2 of the second embodiment having the structure as described above is also configured so that the profile deviation portion D (region to generate radiation modes with large differential group delays) has the structure for coupling the radiation modes generated in this profile deviation portion D, to the cladding modes (or leaking them into the cladding 23 located outside the core 21). This configuration keeps the differential group delays small among propagation modes in the core 21, so as to achieve a wider bandwidth of the multimode optical fiber 2.

Comparative Example

Figure 6:
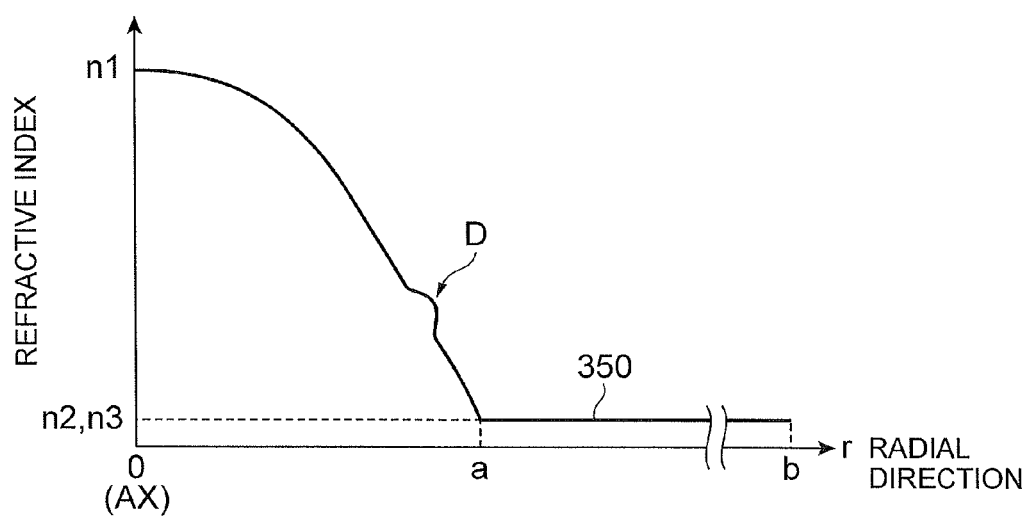
FIG. 6 is a refractive-index profile of a multimode optical fiber according to a comparative example.

FIG. 6 shows a comparative example which was prepared in order to explain a specific effect of the multimode optical fibers 1, 2 according to the aforementioned first and second embodiments (occurrences of differential group delays shown in FIG. 7). FIG. 6 is a refractive-index profile 350 of a multimode optical fiber according to the comparative example and a cross-sectional structure of the optical fiber is the same as that shown in FIG. 1A. Namely, as shown in FIG. 6, the multimode optical fiber of the comparative example has a core extending along a central axis AX (coincident with the optical axis), and a cladding provided on an outer peripheral surface of the core. The core has an outer diameter 2a and an α-power refractive-index profile in which the refractive index continuously decreases along the radial direction from the core center. The core has a maximum refractive index n1 at its center (the core center coincident with the central axis AX) and a minimum refractive index n2 at an interface between the core and the cladding. The cladding has an outer diameter 2b and a refractive index equal to the minimum refractive index n2 of the core. Furthermore, in the multimode optical fiber of the comparative example, the profile deviation portion D where the actual α-power refractive-index profile has the maximum deviation of not less than 0.005% from the ideal profile is also formed in the peripheral region of the core (region not less than 20% of the radius a away from the core center).

FIG. 7 is a table for comparison among occurrences of differential group delays, in each of sample 1 of the multimode optical fiber 1 according to the first embodiment, sample 2 of the multimode optical fiber 2 according to the second embodiment, and the multimode optical fiber of the comparative example.

In each of the multimode optical fibers of samples 1, 2 prepared, the maximum refractive index n1 at the core center is 1.471, the minimum refractive index n2 of the core 1.456, and the refractive index n3 of the cladding 1.460. The outer diameter 2a of the core is 25 μm. The maximum deviation in the profile deviation portion D from the ideal profile with α=2.08 is 0.01% and the position along the core radius assuming the maximum deviation is a position 20 μm away from the core center (the distance $r_{max}$ from the core center).

On the other hand, in the multimode optical fiber of the comparative example prepared, the maximum refractive index n1 at the core center is 1.471, and the minimum refractive index n2 of the core and the refractive index n3 of the cladding equal to the minimum refractive index n2 both are 1.456. The outer diameter 2a of the core is 25 μm. The maximum deviation in the profile deviation portion D from the ideal profile with α=2.08 is 0.01% and the position along the core radius assuming the maximum deviation is a position 20 μm away from the core center (the distance $r_{max}$ from the core center).

As seen from FIG. 7, the differential group delays of higher-order modes out of the differential group delays with respect to the fundamental mode LP01, 1 are small in both of samples 1, 2 having the above structures (i.e., propagation of higher-order modes in core over the sixth order is not recognized in samples 1, 2). On the other hand, propagation of higher-order modes in core over the sixth order is recognized in the comparative example. As a result, it is confirmed that samples 1, 2 enable achievement of a wider bandwidth than the comparative example.

As described above, the present invention enables easy achievement of a wider bandwidth in the multimode optical fiber by having the structure for positively coupling the higher-order modes which can be generated in the peripheral region in the core, to the cladding modes, which has the lower refractive indices than the cladding.

From the above description of the present invention, it will be obvious that the invention may be varied in many ways. Such variations are not to be regarded as a departure from the spirit and scope of the present invention, and all improvements as would be obvious to those skilled in the art are intended for inclusion within the scope of the following claims.

What is claimed is:

1. A multimode optical fiber comprising: a core; and a cladding provided outside the core,
    wherein in a cross section perpendicular to a central axis of the multimode optical fiber, the core is composed of a central region where a distance from the central axis is not more than 20% of a radius of the core, and a peripheral region surrounding the central region,
    wherein the core comprises: a region whose refractive-index profile follows an α-power refractive-index profile; and a region where a refractive index has deviation from an ideal shape of the α-power refractive-index profile and where an absolute value of an amount of the deviation is not less than 0.005% in terms of relative refractive-index difference, wherein a point where the absolute value of the amount of the deviation assumes a maximum is in the peripheral region, and wherein a refractive index of the core in the outer side of the point where the absolute value of the amount of the deviation assumes the maximum is lower than a refractive index of the cladding.

2. The multimode optical fiber according to claim 1, wherein a refractive index in the central region of the core is higher than the refractive index of the cladding.

3. The multimode optical fiber according to claim 1, wherein the cladding is doped with chlorine.

4. The multimode optical fiber according to claim 1, wherein an outer peripheral surface of the core is in contact with the cladding.

5. The multimode optical fiber according to claim 1, further comprising an intermediate layer which is provided between the core and the cladding and which has a lower refractive index than the cladding.

\* \* \* \* \*